Aug. 21, 1928.
T. A. MILLER
1,681,870
SHOCK ABSORBER
Filed Feb. 4, 1927
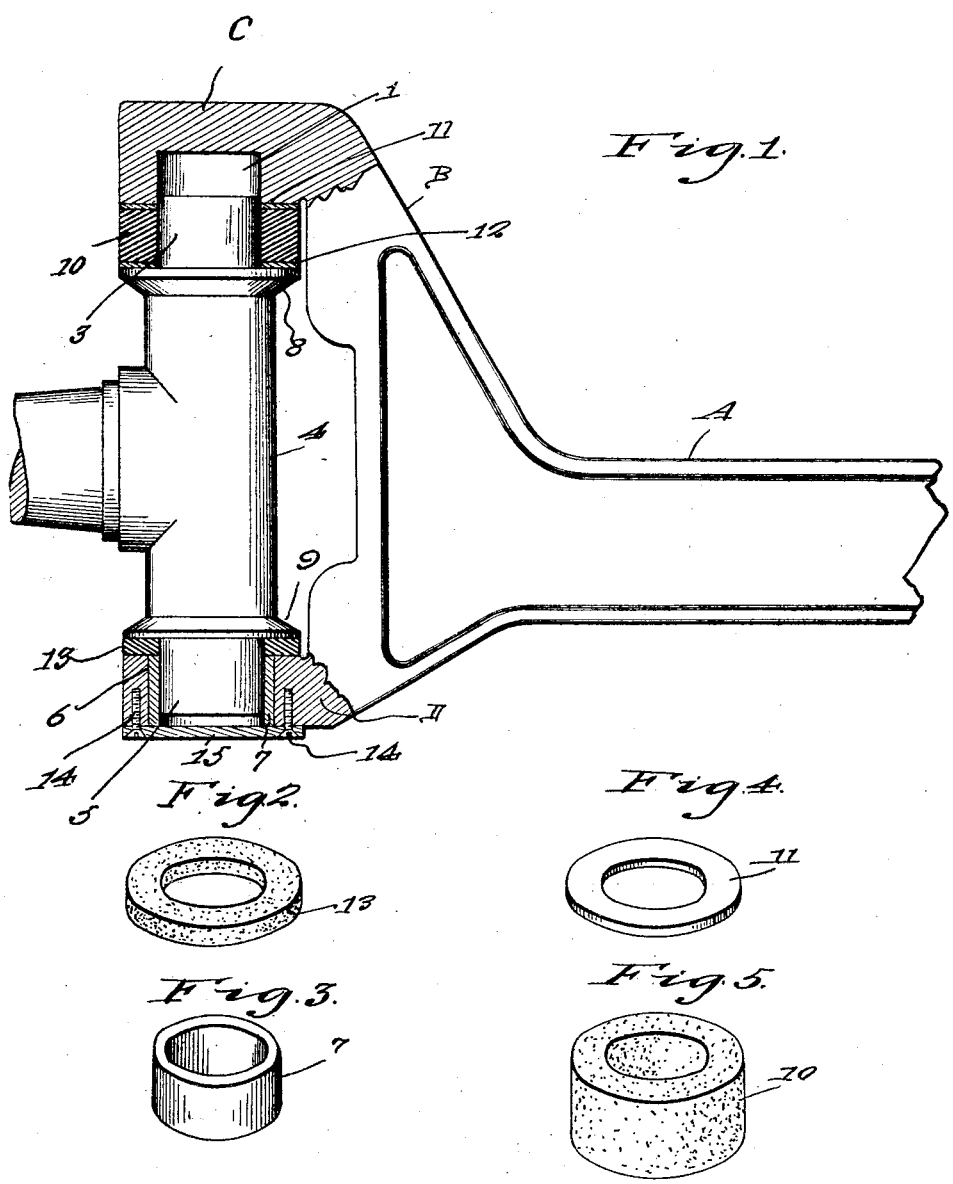

Patented Aug. 21, 1928.

1,681,870

UNITED STATES PATENT OFFICE.

THOMAS A. MILLER, OF MIAMI, FLORIDA.

SHOCK ABSORBER.

Application filed February 4, 1927. Serial No. 165,915.

This invention relates to improvements in steering knuckles for vehicles and its general object is to provide a steering knuckle including shock absorbing elements for the purpose of absorbing road shocks and the like, which the vehicle is subjected to, with the result the riding qualities of the vehicle will be greatly improved as well as prolonging the lift thereof and the steering assembly.

A further object of the invention is to provide a shock absorbing means for the steering knuckles of a vehicle, that is simple in construction and inexpensive to manufacture.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of one end of a front axle and showing my improved steering knuckle with its shock absorbing means in applied position.

Figure 2 is a perspective view of the lower shock absorbing member.

Figure 3 is a similar view of the bearing sleeve,

Figure 4 is a similar view of one of the washers for the upper shock absorbing member.

Figure 5 is a similar view of the upper shock absorbing member.

Referring to the drawings in detail the letter A indicates a fragmentary portion and one end of a front axle of a vehicle, B the fork thereof which includes spaced parallel horizontally arranged portions C and D. The portion C is the upper portion as shown and includes a bore 1 for accommodating a block 2 and the upper bearing 3 of the spindle bolt 4. The lower bearing of the spindle bolt 4 is indicated by the reference numeral 5 and is arranged in the bore 6 of the lower portion D as shown in Figure 1 of the drawings. Surrounding the lower bearing 5 is a sleeve 7 which is disposed between the wall of the bore of the portion D and the bearing 5 of the spindle bolt which is provided at the juncture of its bearing ends 3 and 5 with flanges 8 and 9.

Surrounding the upper bearing end 3 is a sleeve 10 formed from elastic material such as rubber and disposed upon the upper and lower surfaces of said sleeve are metalic washers 11 and 12 respectively. Surrounding the lower bearing end and disposed between the flange 9 and the upper surface of the portion D is a relatively wide washer 13 which is also formed from elastic material such as rubber. Fixed to the lower surface of the portion D through the instrumentality of screw bolts 14 is a plate 15 which retains the sleeve 7 in cooperative position and against the washer 13 as shown in Figure 1 of the drawings.

From the above description and disclosure in the drawings it will be obvious that I have provided a steering knuckle including shock absorbing elements which will not only prevent rattle and have a tendency to compensate for wear between the respective associated parts, but will also absorb many road shocks, with the result the riding qualities of a vehicle equipped with my novel steering knuckle, will be greatly improved as well as prolonging the life thereof, as will be readily apparent.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A steering knuckle of the character described comprising a spindle bolt having bearing ends, a resilient sleeve surrounding one of said ends, washers surrounding said last mentioned end and disposed upon opposite sides of said sleeve, a washer surrounding the other of said bearing ends, a sleeve surrounding said last mentioned end and means for retaining said sleeve thereon.

2. A steering knuckle of the character described comprising a spindle bolt having bearing ends adapted to be received in a forked end of the axle of a vehicle, an elastic sleeve surrounding the upper bearing end for engagement with the upper portion of the fork, washers also surrounding said last mentioned end and disposed upon opposite sides of said sleeve, an elastic washer surrounding the opposite bearing end and disposed to engage the lower portion of the fork, a sleeve also surrounding said last mentioned end and engaging said elastic washer, and a plate securing said last mentioned sleeve in operative position about its bearing end.

In testimony whereof I affix my signature.

THOMAS A. MILLER.